US008117336B2

(12) United States Patent
Dernosek et al.

(10) Patent No.: US 8,117,336 B2
(45) Date of Patent: Feb. 14, 2012

(54) METHODS, SYSTEMS, AND COMPUTER PROGRAM PRODUCTS FOR PROVIDING ACCIDENTAL STACK JOIN PROTECTION

(75) Inventors: Louis A. Dernosek, Durham, NC (US); Donald B. Grosser, Apex, NC (US); Michael D. Mroz, Fuquay Varina, NC (US); Hood L. Richardson, Jr., Chapel Hill, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 292 days.

(21) Appl. No.: 11/809,224

(22) Filed: May 31, 2007

(65) Prior Publication Data

US 2008/0301319 A1    Dec. 4, 2008

(51) Int. Cl.
*G06F 15/173* (2006.01)
(52) U.S. Cl. ........................................ 709/238; 710/316
(58) Field of Classification Search .................. 709/238; 710/316
See application file for complete search history.

(56) References Cited

U.S. PATENT DOCUMENTS

| 2002/0167896 A1* | 11/2002 | Puntambekar | 370/216 |
| 2005/0073963 A1* | 4/2005 | Goodfellow et al. | 370/255 |
| 2006/0146697 A1* | 7/2006 | Magret et al. | 370/219 |
| 2007/0014234 A1* | 1/2007 | Santoso et al. | 370/216 |

OTHER PUBLICATIONS

Notification of Transmittal of the International Search Report and the Written Opinion of the International Searching Authority, or the Declaration for International Application No. PCT/US2008/006929 (Aug. 7, 2008).
First Office Action for Chinese Patent Application No. 200880017891.4 (Oct. 26, 2011).

* cited by examiner

*Primary Examiner* — Ashok Patel
*Assistant Examiner* — Lawrence Cosby
(74) *Attorney, Agent, or Firm* — Jenkins, Wilson, Taylor & Hunt, P.A.

(57) ABSTRACT

The subject matter described herein includes methods and systems for providing accidental stack join protection. According to one embodiment, a method includes connecting stacking ports of a first switch that is a member of a first stack and a second switch that is a member of a second stack and thereby joining the first and second stacks. The configurations of the first stack and of the second stack are detected and it is determined whether the detected configurations indicate a configuration mismatch between the first and second stacks. In response to determining that the detected configurations relate to a mismatch, the automatic joining of the first and second stacks is inhibited and the first and second stacks are allowed to continue switching traffic with their existing configurations.

15 Claims, 3 Drawing Sheets

METHODS, SYSTEMS, AND COMPUTER PROGRAM PRODUCTS FOR PROVIDING ACCIDENTAL STACK JOIN PROTECTION

TECHNICAL FIELD

The subject matter described herein relates to stack joining of network devices. More particularly, the subject matter described herein relates to methods, systems, and computer program products for providing accidental stack join protection.

BACKGROUND

In communications networks, switches may be grouped together in stacks for switching under common management. A switch stack (hereinafter also referred to simply as a "stack") is a collection of one or more switches interconnected via dedicated ports and cables that functions as a single switch from the user's perspective and that operates under common control or management. Switches belonging to a switch stack are said to be joined, and the switch stack may be capable of data transfer capacities beyond those of any individual switch joined in the stack. Switches in a switch stack are referred to herein as members of the stack. Centralized management of the stack members may be accomplished by communicating between member switches using the dedicated ports and cables described above.

In one example of when it may be desirable to join switches as members of a common stack is when an operator wishes to incrementally add switching capacity to his or her network. For example, the network may initially have a single standalone switch that switches packets and performs management functions, such as maintaining routing or forwarding tables. If the operator desires to double the switching capacity, rather than purchasing a new switch with twice the capacity of the original switch, the operator may purchase a switch with the same capacity as the original switch. The operator may configure the new switch to join the stack of the original switch. The two switches, being members of a common stack, function as a single switch with double the switching capacity while retaining common management.

In a typical embodiment, a stack member may be selected to provide centralized management functions for the stack and will hereinafter be referred to as the "stack master". In addition to providing centralized management functionality, a stack master is also a member of the stack. The ports and cables dedicated to communicating information associated with stack management will hereinafter be referred to as "stacking ports" and "stacking links," respectively. Stacking links may be used to transmit data using protocols designed to allow data plane constructs, such as Virtual Local Area Networks (VLANs) and Link Aggregation Groups, to contain ports belonging to different switches within the stack. Stacking links may carry both data plane traffic and management plane traffic, including traffic associated with control and status of the stack.

Current implementations of switch stacks provide for automatically joining connected switches into a switch stack because it is assumed that when a physical connection is made between the stacking ports of two switches the user intended to join the connected switches into a stack. This process may be referred to as "automatic stack joining". When a switch automatically joins a stack, its configuration including layer 3 routing and layer 3 forwarding tables, may be replaced with configuration data for the stack.

One problem associated with conventional automatic stack joining is that, in many cases, the physical connection of the stacking ports of two switch stacks may be made accidentally, and consequently result in the unintended and undesired reconfiguration of the switch that was mistakenly connected to the stack. Such undesired reconfiguration can result in the switches layer 2 forwarding and layer 3 routing tables being overwritten. As a result, the switch will no longer be able to properly route or switch packets for its network without manual re-provisioning by an operator. Unintentional automatic stack joining can be common in switch equipment installations where the density of switches and associated cabling is high.

Accordingly, a need exists for improved methods and systems for providing accidental stack join protection.

SUMMARY

The subject matter described herein includes methods and systems for providing accidental stack join protection. According to one embodiment, a method includes connecting stacking ports of a first switch that is a member of a first stack and a second switch that is a member of a second stack and thereby joining the first and second stacks. The configurations of the first stack and of the second stack are detected and it is determined whether the detected configurations indicate a configuration mismatch between the first and second stacks. In response to determining that the detected configurations relate to a mismatch, the automatic joining of the first and second stacks is inhibited and the first and second stacks are allowed to continue switching traffic with their existing configurations.

According to another aspect, a system for providing accidental stack join includes a first switch that includes a stacking port and is a member of a first stack and a second switch that includes a stacking port and is a member of a second stack, where the stacking port of the second switch is connected to the stacking port of the first switch. The system includes a stack joining manager for detecting configurations of the first and second stacks, determining whether the detected configurations indicate a configuration mismatch between the first and second stacks, and in response to determining that the detected configurations indicate a mismatch, inhibiting automatic joining of the first and second stacks and allowing the first and second stacks to continue switching traffic with their existing configurations.

DETAILED DESCRIPTION

Figure 1:
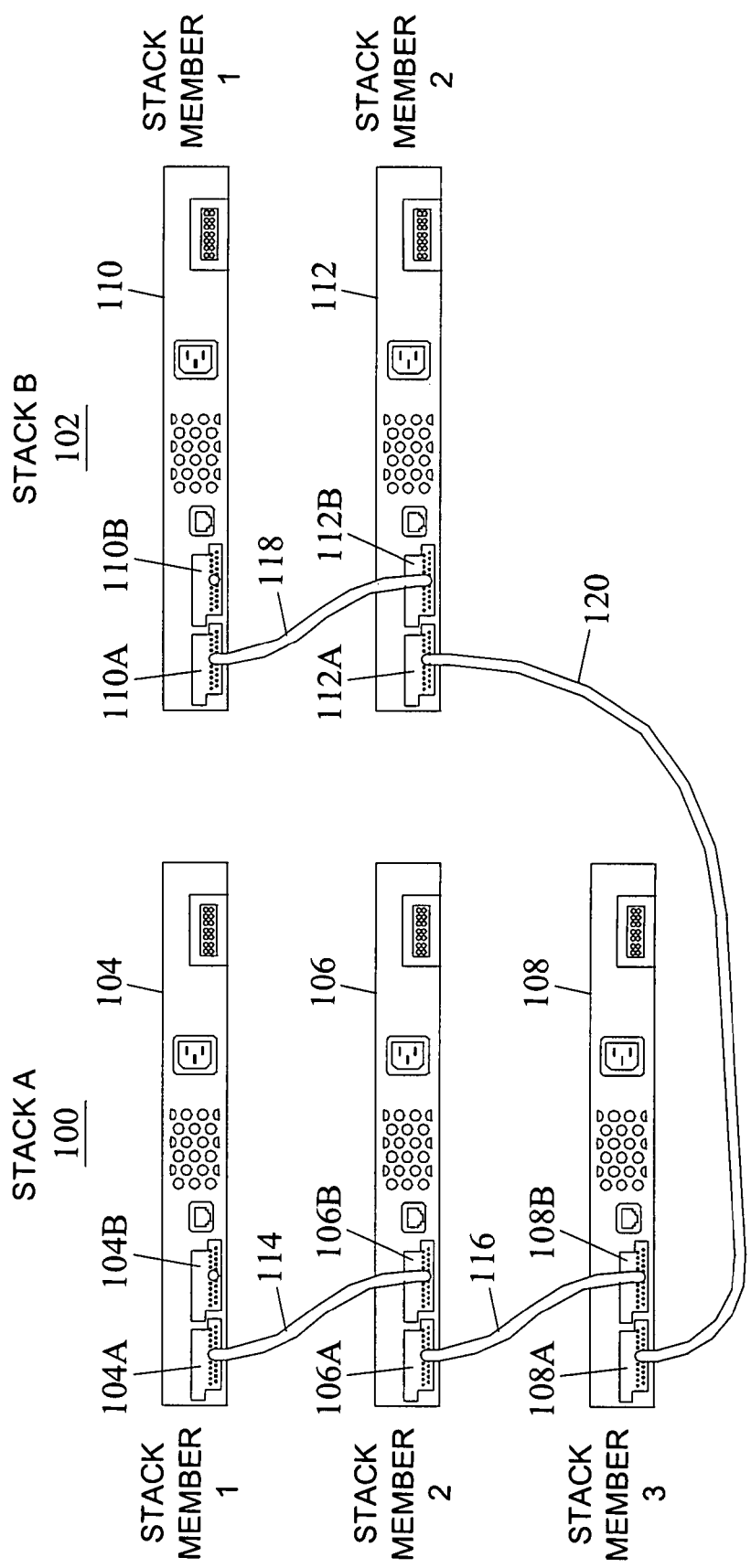
FIG. 1 is a diagram of exemplary switch stacks for providing accidental stack join protection according to an embodiment of the subject matter described herein.

FIG. 1 is a diagram of an exemplary system for providing accidental stack join protection according to an embodiment of the subject matter described herein, the system including one or more switches belonging to one or more stacks. Referring to FIG. 1, stacks A 100 and stack B 102 each include multiple stack members. For example, stack A 100 includes switches 104, 106, and 108, and stack B 102 includes switches 110 and 112. Each switch 104, 106, 108, 110, and 112 may implement any transmission control protocol/Internet protocol (TCP/IP) layer, including, but not limited to, network layer 2, transport layer 3, and application layer 4. Examples of switches that it may be desirable to join into stacks include the Summit™ switch available from Extreme Networks of Santa Clara, Calif. or the Catalyst 3750™ switch available from Cisco Systems of San Francisco, Calif.

FIG. 1 illustrates the rear sides of switches 104, 106, 108, 110, and 112. It is understood that such switches would also include front sides that include switching ports that connect to data cables, which connect to a user's network for switching traffic in the network. Stack A 100 may have a stack identifier, such as a stack name, and includes switches 104, 106, and 108 that may be identified by a slot identifier, such as a slot number. Stack names and slot numbers may be stored in non-volatile memory within each switch 104-108. In FIG. 1, switch 104 is identified by slot number 1, switch 106 is identified by slot number 2, and switch 108 is identified by slot number 3. In addition to being a stack member, switch 104 may be the stack master for stack A 100. It is appreciated that the slot numbers described above are for identification purposes and may not necessarily correspond to the physical location of switches 104-108. Therefore, switches 104-108 may, or may not, be physically located in a rack including slots corresponding to the slot numbers assigned to each switch.

In stack A 100, switches 104-108 may include stacking ports for communicating between switches 104-108 within stack A 102. In the embodiment illustrated in FIG. 1, each of switches 104-108 includes two stacking ports 104A, 104B, 106A, 106B, 108A, and 108B for interconnecting switches 104-108 within stack A 102. It is appreciated that while FIG. 1 illustrates a dual-stacking port embodiment, switches 104-108 may include any number of stacking ports suitable for connecting switches within a stack without departing from the scope of the subject matter described herein.

In one embodiment, switches 104-108 may be connected in a daisy chain configuration. For example, in FIG. 1, switch 104 is connected to switch 106 via stacking link 114. Switch 106 may also be connected to switch 108 via stacking link 116. In such a configuration, switches 104 and 108 are located at each end of the chain. Therefore, stack A 100 includes three switches connected in a daisy chain configuration.

In an alternate embodiment, switches 104-108 may be connected in a ring configuration by connecting each end of the daisy chain configuration described above. For example, a user wishing to convert the daisy chain configuration of stack A 100 into a ring configuration may connect stacking ports 108A and 104B on switches 108 and 104, respectively.

In stack B 102, switches 110 and 112 may be identified by slot number 1 and slot number 2, respectively. Switches 110 and 112 may have stacking ports 11A, 110B and 112A and 112B, respectively. In addition to being a stack member, switch 110 may be the stack master for stack B 102. Slot numbers and stack names for switches 110 and 112 may be also be stored in non-volatile memory located on each switch. In stack B 102, switch 110 is connected to switch 112 via stacking link connection 118. Therefore, stack B 102 includes two switches connected in a daisy chain configuration.

In addition to stacking links 114-118 for connecting switches within stacks 100 and 102, stacking link 120 may interconnect stack A 100 and stack B 100 by connecting, for example, stacking port 108A on switch 108 and stacking port 112A on switch 112. The joining of stacks A and B via stacking link 120 may represent either an intentional desire to join stack A 100 and stack B 102 into a single stack, or alternately, may represent an accidental connection between stack members 108 and 112. For example, a user may attempt to convert the daisy chain configuration of stack A 100 into a ring configuration by connecting switches 104 and 108 via stacking link 120. However, rather than connecting switch 108 to switch 104, the user may accidentally connect switch 108 to switch 112. This accidental connection may be especially easy to make due to the variable physical locations of switches 104-108 and 110-112.

In a scenario where stacking link 120 represents an accidental connection of stacks 100 and 102, automatic joining of stacks 100 and 102 may be undesirable. Accordingly, the subject matter described herein includes determining whether stacking link 120 represents an accidental connection and preventing the automatic joining of stacks 100 and 102, which will be described in greater detail below.

Figure 2:
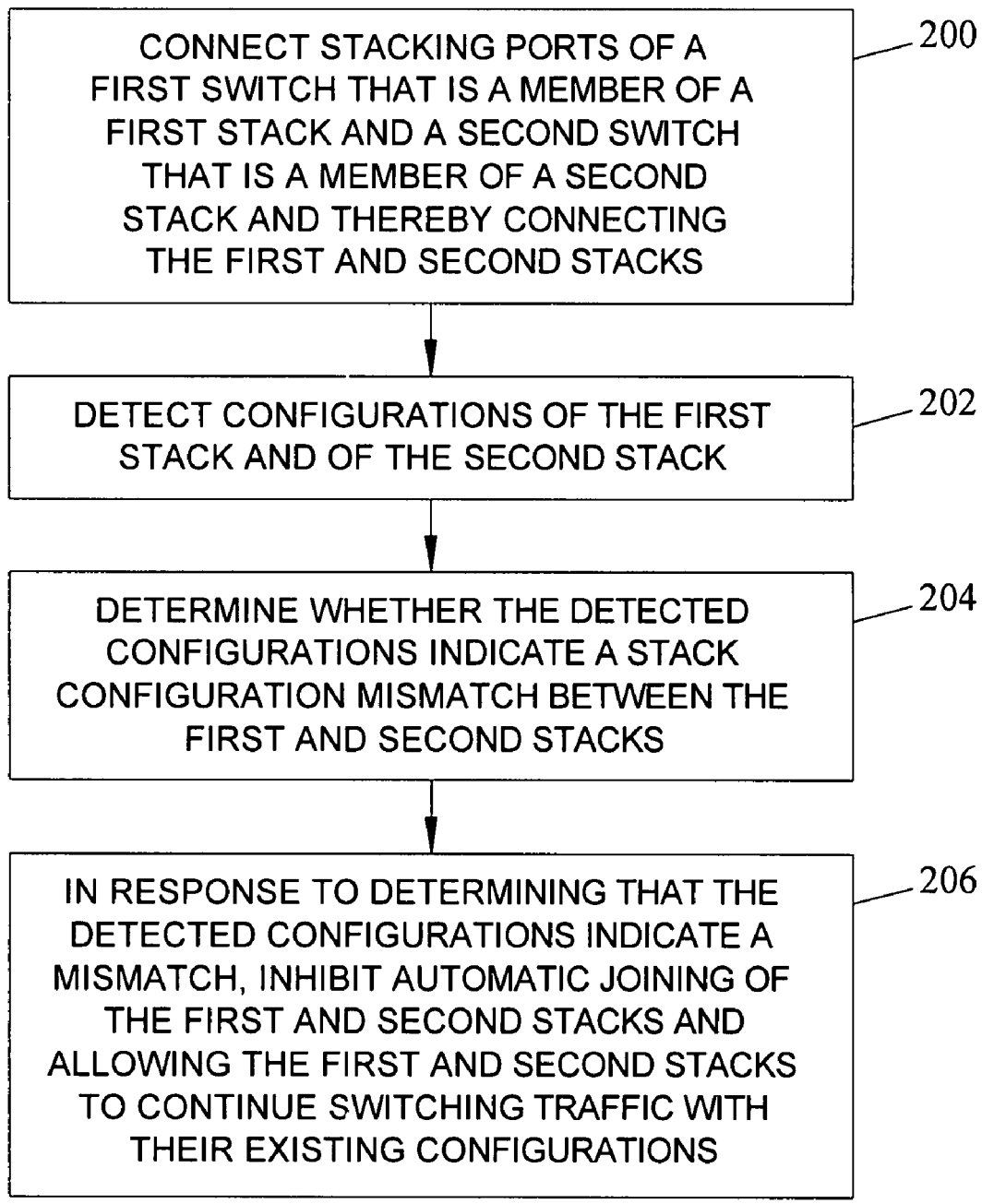
FIG. 2 is a flow chart of an exemplary process for providing accidental stack join protection according to an embodiment of the subject matter described herein.

FIG. 2 is a flow chart of an exemplary process for providing accidental stack join protection according to an embodiment of the subject matter described herein. Referring to FIG. 2, in block 200, a connection is made between stacking ports of a first switch and a second switch, where the first and second switches are members of a first stack and a second stack, respectively. It is appreciated that, as used herein, the term "connecting two stacks" includes connecting the stacking ports of two switches via a stacking link, where the connected switches may be any member of their respective stacks. For example, stack A 100 may be connected to stack B 102 by connecting any of switches 104-108 to any of switches 110-112. It is not necessary for stack masters to be connected or that there be any relationship between the slot numbers associated with each connected switch.

In block 202, configurations of the connected switches are detected. The detected configuration may include a slot identifier, a stack identifier, an operational status, and any other configuration information suitable for detecting a stacking mismatch. In FIG. 1, the detected configuration for switches 104-108 may include stack identifier A, where stack A 100 is an operational switch stack. Additionally, the detected configuration for switch 104 may include slot identifier 1 and an operational status indicating that switch 104 is the active stack master for stack A 100. Similarly, detected configurations for switches 106 and 108 may include slot identifiers 2 and 3, respectively, and an operational status indicating that switches 106 and 108 are members of stack A 100.

In stack B 102, the detected configurations of switches 110 and 112 include stack identifier B, where stack B 102 is an operational switch stack. The configuration may also include slot identifiers 1 and 2 associated with switches 110 and 112, respectively, and an operational status indicating that switch 110 is the active stack master for stack B 102 and switch 112 is a stack member of stack B 102.

Therefore, upon connecting switches 108 and 112, the configurations described above may be communicated via stacking link 120 to the stack masters of each stack. For example, the configuration information may be communicated between stack master A 104 and stack master B 110 over all of the stacking links shown in FIG. 1.

In block 204, it is determined whether the detected configurations indicate a mismatch. A configuration mismatch between two connected stacks may include a duplicated slot identifier, different stack identifiers, and any other configuration information suitable for detecting a stack mismatch. For example, in the stack configurations illustrated in FIG. 1, three configuration mismatches may be determined. A first mismatch may include duplicated slot number 1. Specifically, switches 104 and 110 are each associated with slot number 1. Because a single stack may not contain duplicated slot numbers, a mismatch is determined and a lack of intent to join the stacks 100 and 102 may be inferred. A second mismatch may include duplicated slot number 2, where switches 106 and 112 are each associated with slot number 2. It is appreciated that even a single duplicated slot number within stacks 100 and 102 may be a sufficient basis for determining a configuration mismatch. Therefore, the elimination of only one of the two duplicated slot numbers within stacks 100 and 102 would not change the determination that a mismatch exists and that automatic joining of the stacks may not be the intent of the user. A third mismatch may include differing stack names between stacks 100 and 102. Specifically, switches 104-108 within stack 100 are each associated with stack name A while switches 110-112 within stack 102 are associated with stack name B. In this case, differing stack names A and B may indicate that stacks A 100 and B 102 were intended to be different stacks and therefore should not be automatically joined.

In block 206, in response to determining that the detected configurations relate to a mismatch, the automatic joining of the switches is inhibited and the switches are allowed to continue switching traffic with their existing configurations. As used herein, inhibiting a stacking link may include blocking the transmission of packets associated with data and non-stacking related management, while allowing transmission of packets associated with stacking-specific management. For ease of discussions, data transmitted between switches via stacking links may be broadly divided into data traffic and management traffic. As used herein, management traffic may be further divided into management traffic specifically for providing and/or managing stacking-related services (hereinafter referred to as the "stack path") and management traffic not directly associated with managing stacking-related services (hereinafter referred to as the "management path"). Thus, packets transmitted across stacking links 114-120 may belong to either the data path, the management path, or the stacking path, and will be described in greater detail below.

The data path may carry data traffic. For example, data path traffic may include data packets and/or network control packets for protocols such as open shortest path first (OSPF), border gateway protocol (BGP), and spanning tree protocols. The management path may carry management traffic for the management plane not specific to stacking control and status. For example, management path traffic may include hardware control commands, software state synchronization, and packets used for configuring the data plane. The stack path carries traffic that is specific to stacking control and status. For example, stack path traffic may include packets including slot numbers, stack names, packets used for determining the topology and/or status of the stack. It is appreciated that the three communications paths described above relate to logical, rather than physical, distinctions between the types of traffic that may be carried via stacking connections, such as stacking links 114, 116, 118, and 120.

Inhibiting a stacking link includes preventing the automatic joining of two or more connected stacks by blocking the transmission of data and management path traffic, while providing for the manual configuration of the stack by allowing stacking-specific traffic to be transmitted across stacking links. Therefore, in the event that accidental stack join protection is employed based on a detected configuration mismatch, yet the user intended to join the connected stacks, the user may manually override the accidental stack join protection described herein in order to create a desired stack.

In a scenario in which stacking link 120 does not represent an accidental connection between stacks 100 and 102, but instead represents an intent by the user to join stacks 100 and 102 into a single stack, reconfiguration of one or more stack names and slot numbers may be required. For example, the stack name associated with switches 110 and 112 may be changed from B to A in order to for switches 110 and 112 to join stack A 100. Additionally, slot numbers associated with switches 110 and 112 may be changed to 4 and 5, respectively, in order for switches 110 and 112 to join stack A 100. However, in the exemplary scenario described above, it is appreciated that the slot numbers associated with switches 110 and 112 during reconfiguration need to only be unique within the stack, and do not need to relate to each switch's physical and/or logical location within the stack.

Figure 3:
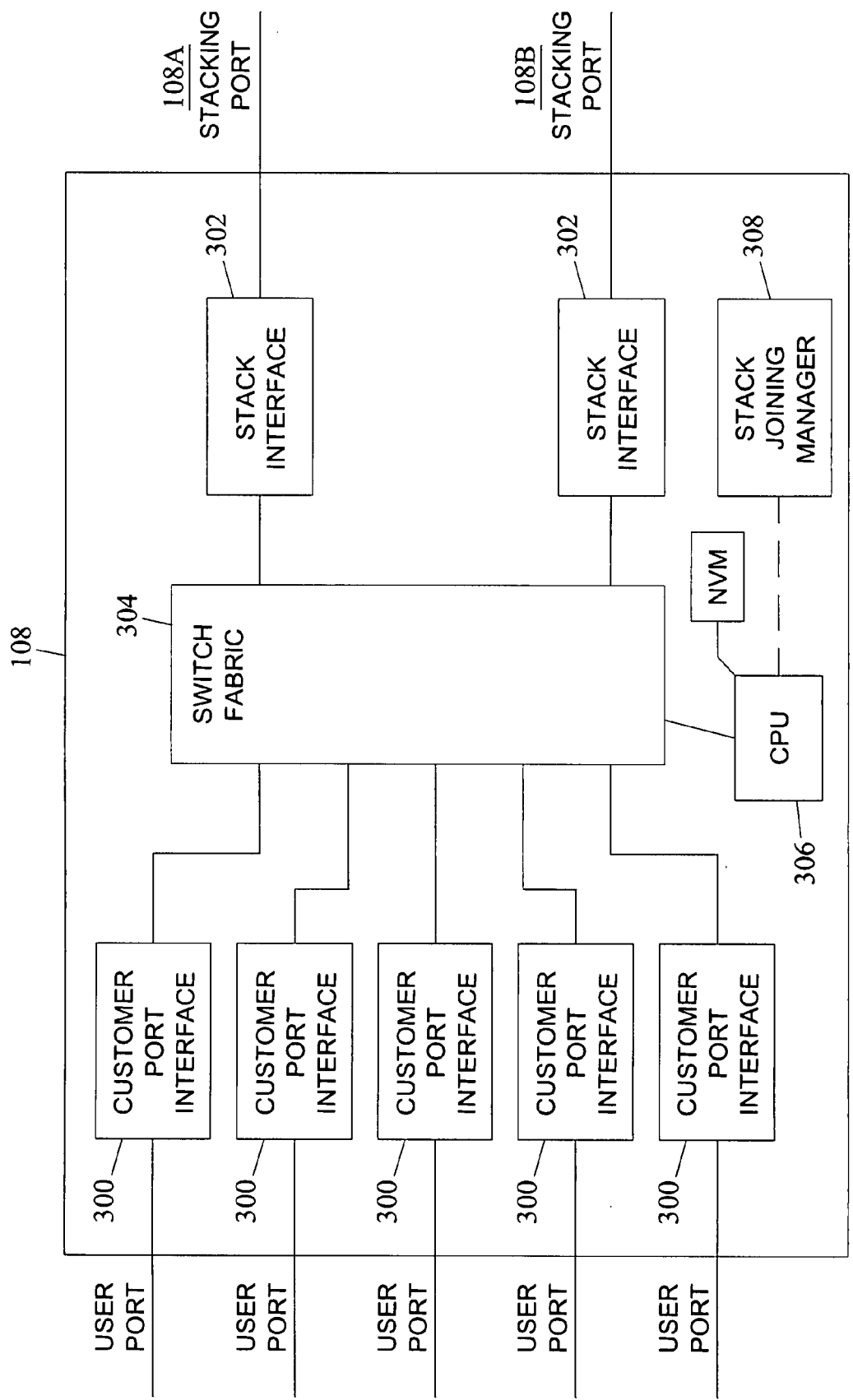
FIG. 3 is a block diagram of an exemplary internal architecture of a switch for providing accidental stack join protection according to an embodiment of the subject matter described herein.

FIG. 3 is a block diagram of an exemplary internal architecture of a switch for providing accidental stack join protection according to an embodiment of the subject matter described herein. A switch suitable for providing accidental stack join protection may include the Summit X450e switch produced by Extreme Networks, Inc., of Santa Clara, Calif.

Referring to FIG. 3, switch 108 includes a plurality of customer port interfaces 300, a pair of stack interfaces 302 connected to stacking ports 122 and 124, switch fabric 304, central processing unit (CPU) 306, a stack manager 308, and non-volatile memory (NVM). Customer port interfaces 300 may include hardware and software for receiving packets and forwarding the packets for transmission over an outbound network port. Switch fabric 304 may include a bus or other suitable medium for transferring packets or frames between customer port interfaces 300, stack interfaces 302, and CPU 306.

CPU 306 may execute the stack joining manager 308 logic, where stack joining manager 308 may include software comprising computer executable instructions stored in a computer readable memory, such as random access memory (RAM). Central processing unit 306 may perform switch management and administrative functions associated with switch 108. In addition, stack joining manager 308 may receive information from stack interfaces 302 for detecting configurations of switches connected to switch 108. As described above, the detected configuration may include a slot number, a stack identifier, an operational status of the connected switch associated with each switch connected to switch 108, and any other configuration information suitable for detecting a stack mismatch. The detected configurations may be used to determine whether an accidental connection is indicated and therefore whether the automatic joining of the stack should be prevented.

For example, switch 108 may be joined to an operational switch stack including a plurality of switches. Switch 108 may further be identified by a slot number 1 and belonging to stack A. When a switch not belonging to a stack ("a standalone switch") is connected to switch 108 via a stacking link 108A, data may be transmitted between the connected switch and switch 108 and received by stack joining manager 308. The newly connected switch, in this example, may also be operational at the time it is connected and be identified by slot number 1. Therefore, stack joining manager 308 may determine, based on the detected configuration, whether an accidental connection is indicated.

In this scenario, duplicate slot numbers are detected (i.e. both switches are identified by slot number 1) and therefore the connection between the switches is inhibited. As described above, inhibiting the connection between the switches prevents automatic joining of the switches into a single switch stack. This may be implemented by blocking the transmission of data packets and management packets not associated with stacking management, configuration, or status. However, packets associated with stacking-specific management, configuration, and status are allowed to be transmitted so as to allow for the manual configuration of the stack in the event that the user intends to merge the two stacks.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing accidental stack join protection, the method comprising:
    connecting stacking ports of a first switch that is a member of a first stack and a second switch that is a member of a second stack and thereby connecting the first and second stacks;
    detecting configurations of the first stack and of the second stack;
    determining whether the detected configurations indicate a stack configuration mismatch which indicates an accidental connection between the first and second stacks, wherein an accidental connection is an unintentional connection between the first and second stacks made by a user;
    wherein determining whether the detected configurations indicate a stack configuration mismatch includes determining whether the first and second stacks are operational, whether a slot identifier is duplicated between the first and second stacks, and whether a stack identifier associated with the first stack is different than a stack identifier associated with the second stack; and
    in response to determining that the detected configurations indicate a mismatch which indicates an accidental connection, inhibiting automatic joining of the first and second stacks and allowing the first and second stacks to continue switching traffic with their existing configurations, wherein inhibiting automatic joining of the first and second stacks includes blocking the transmission of data packets and management packets not associated with stacking control and status between the first and second switches and allowing the transmission of packets associated with stacking control and status between the first and second switches, and wherein allowing the first and second stacks to continue switching traffic with their existing configurations includes allowing transmission and reception of network traffic using at least one non-stacking port at one or more of the first and second stacks.

2. The method of claim 1 comprising in response to determining that the detected configurations do not indicate a mismatch, automatically joining the first and second stacks.

3. The method of claim 1 wherein connecting the first and second stacks includes connecting at least one of two single-member stacks, two multi-member stacks, and a single-member stack and a multi-member stack.

4. The method of claim 1 wherein detecting configurations of the first and second stacks includes, for each switch, detecting at least one of a stack identifier, a slot identifier, and an operational status indicator.

5. The method of claim 1 wherein the data packets and management packets not associated with stacking control and status include at least one of open shortest path first (OSPF) packets, border gateway protocol (BGP) packets, spanning tree protocol packets, hardware control commands, software state synchronization packets, and packets associated with configuring the processing of data packets.

6. The method of claim 1 wherein the packets associated with stacking control and status include packets used to change stacking specific configurations, packets used for determining the topology of the stack, and packets used for determining the status of the stack.

7. The method of claim 6 wherein the packets associated with stacking control and status include packets for configuring at least one of a slot identifier, a stack identifier, and an operational status.

8. A system for providing accidental stack join protection, the system comprising:
    a first switch that includes a stacking port and is a member of a first stack;
    a second switch that includes a stacking port and is a member of a second stack, where the stacking port of the second switch is connected to the stacking port of the first switch; and
    a stack joining manager for detecting configurations of the first and second stacks, determining whether the detected configurations indicate a stack configuration mismatch which indicates an accidental connection between the first and second stacks, wherein an accidental connection is an unintentional connection between the first and second stacks made by a user and wherein the stack joining manager is configured to determine whether the first and second stacks are operational as indicated by the operational status indictors and at least one of a slot identifier is duplicated between the first and second stack and the stack identifier of the first stack is different than the stack identifier of the second stack, and
    in response to determining that the detected configurations indicate a mismatch which indicates an accidental connection, inhibiting automatic joining of the first and second stacks and allowing the first and second stacks to continue switching traffic with their existing configurations, wherein inhibiting automatic joining of the first and second stacks includes blocking the transmission of data packets and management packets not associated with stacking control and status between the first and second switches and allowing the transmission of packets associated with stacking control and status between the first and second switches, and wherein allowing the first and second stacks to continue switching traffic with their existing configurations includes allowing transmission and reception of network traffic using at least one non-stacking port at one or more of the first and second stacks.

9. The system of claim 8 wherein the stack joining manager is configured to, in response to determining that the detected configurations do not indicate a mismatch, automatically join the first and second stacks.

10. The system of claim 8 wherein the first and second stacks include at least one of two single-member stacks, two multi-member stacks, and a single-member stack and a multi-member stack.

11. The system of claim 8 wherein the stack joining manager is configured to detect at least one of a stack identifier, a slot identifier, and an operational status indicator.

12. The system of claim 8 wherein the data packets and management packets not associated with stacking control and status include at least one of open shortest path first (OSPF) packets, border gateway protocol (BGP) packets, spanning tree protocol packets, hardware control commands, software state synchronization packets, and packets associated with configuring the processing of data packets.

13. The system of claim 8 wherein the packets associated with stacking control and status include packets used to change stacking specific configurations, packets used for determining the topology of the stack, and packets used for determining the status of the stack.

14. The system of claim 13 wherein the packets associated with stacking control and status include packets for configuring at least one of a slot identifier, a stack identifier, and an operational status.

15. A computer program product comprising computer-executable instructions embodied in a non-transitory computer-readable medium for performing steps comprising:
   connecting stacking ports of a first switch that is a member of a first stack and a second switch that is a member of a second stack and thereby connecting the first and second stacks;
   detecting configurations of the first switch and of the second switch;
   determining whether the detected configurations indicate a stack configuration mismatch which indicates an accidental connection between the first and second stacks, wherein an accidental connection is an unintentional connection between the first and second stacks made by a user wherein determining whether the detected configurations indicate a stack configuration mismatch includes determining whether the first and second stacks are operational, whether a slot identifier is duplicated between the first and second stacks, and whether a stack identifier associated with the first stack is different than a stack identifier associated with the second stack; and
   in response to determining that the detected configurations indicate a mismatch which indicates an accidental connection, inhibiting automatic joining of the first and second stacks and allowing the first and second stacks to continue switching traffic with their existing configurations, wherein inhibiting automatic joining of the first and second stacks includes blocking the transmission of data packets and management packets not associated with stacking control and status between the first and second switches and allowing the transmission of packets associated with stacking control and status between the first and second switches, and wherein allowing the first and second stacks to continue switching traffic with their existing configurations includes allowing transmission and reception of network traffic using at least one non-stacking port at one or more of the first and second stacks.

* * * * *